Figure 1:
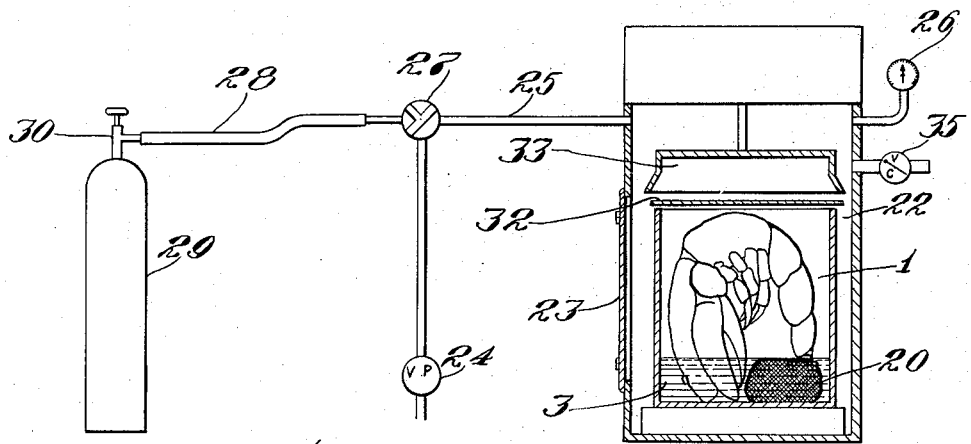

Aug. 7, 1951     B. E. PROCTOR     2,563,364
CONTAINER FOR THE PRESERVATION OF LIVE SHELLFISH
Filed April 11, 1946

Inventor
Bernard E. Proctor
by Roberts, Cushman & Grover
Att'ys.

Patented Aug. 7, 1951

2,563,364

UNITED STATES PATENT OFFICE 2,563,364

CONTAINER FOR THE PRESERVATION OF LIVE SHELLFISH

Bernard E. Proctor, Melrose, Mass., assignor, by mesne assignments, to Live-Pak Seafoods Co., Boston, Mass., a corporation of Massachusetts Application April 11, 1946, Serial No. 661,183

3 Claims. (Cl. 119—2)

This invention relates to the preservation of shellfish, such as lobsters, crabs, clams, oysters, etc., in live and healthy condition within a sealed container, so that the shellfish may be transported to remote points for storage and consumption.

The principal object of the present invention is to provide an improved method of and means for prolonging the life of shellfish within an enclosed or hermetically sealed container, so that they shall be available for distribution over greater areas and suitable and safe for human consumption for longer periods of time than has heretofore been possible. Further objects will be apparent from a consideration of the following description.

It has long been recognized that in order to keep shellfish alive and in healthy condition in an artificial environment such, for example, as a shipping container, it is necessary that certain essential conditions of the habitat be simulated as closely as possible. To this end it has been suggested not only to use water from which the shellfish has been taken, but also to provide means for supplying and maintaining the requisite amount of oxygen, as well as to maintain temperature conditions not exceeding, but preferably substantially lower than those of the habitat. It has also been recognized that provision must be made for the removal of carbon dioxide eliminated by the shellfish, and to this end various suggestions have been made, involving either aeration of the water, circulation of the gaseous atmosphere above the water through an absorption medium, or the addition of an insoluble carbonate to the water so as to react with the carbon dioxide to form a bicarbonate. In all such cases it has been considered necessary to avoid the use of any extraneous material which would result in a substantial change in or alteration of the chemical composition of the water, the addition of soluble compounds to the water which increases the pH above 8 being considered harmful, if not fatal, to the well being of the shellfish.

Methods involving aeration of the water and circulation of the gaseous atmosphere require the use of sizable apparatus, and because of practical considerations involved in transportation, the use of such methods is impractical. The addition of an insoluble carbonate, although overcoming certain of the aforementioned difficulties, has not been found generally satisfactory because such compounds are apparently incapable of effectively disposing of the toxic carbon dioxide eliminated by the shellfish and, at best, are efficacious for only a relatively short period of time. Moreover, the use of such carbonates involves the formation of a soluble bicarbonate which is highly unstable, being quite apt to break down in a slightly acid medium to revert to free carbon dioxide and a carbonate.

I have found that in addition to observing the aforementioned requirements (adequate oxygen supply, presence of water and temperature control) and contrary to the aforementioned prevailing beliefs, shellfish may be kept alive and in healthy condition for prolonged periods of time in an artificial environment by incorporating therein certain extraneous compounds which are at least slightly soluble in water to establish a pH of at least 9, notwithstanding that such compounds may alter the chemical composition of the water of the habitat. Such compounds constitute a class which I have designated as "the basic, non-toxic, alkaline earth metal compounds" (hereinafter referred to as the basic compounds) which term includes only those compounds of calcium, barium, strontium, and magnesium which are basic, i. e., which on dissociation in water or when decomposed in water yield excess hydroxyl ions, which are non-toxic to the shellfish and reactive with carbon dioxide to form a non-toxic carbonate.

I have also found that certain stable soluble non-toxic salts of the alkali metal and alkaline earth group (hereinafter referred to as "soluble salts"), when added to the water within the container in amounts sufficient to effect an appreciable increase in its salinity, are also effective in prolonging the life of shellfish; and that when such soluble salts are used in conjunction with the aforementioned basic compounds, they increase the efficiency of the latter and hence the use of such soluble salts in addition to the basic compounds is advantageous and in many cases advisable, even though not necessary for prolongation of the life of the shellfish for the desired periods.

In accordance with the present invention live shellfish to be stored or transported are placed in a suitable container capable of being sealed, together with a quantity of water taken from or closely simulating that of the habitat, to which may be added, if desired, one or more of the aforementioned soluble salts, either in aqueous solution or as a dry powder, in an amount to produce a predetermined increase in the salinity of the water preferably of the order of 1° S. to 6° S. The size and shape of the container may vary, depending upon the type, number and size of shellfish to be stored or transported; for example, for shipment or storage of one or two lobsters, a conventional metal can of approximately one gallon capacity may be employed; for a large quantity tanks may be employed; and for situations intermediate these extremes drums or other types of containers may be employed. Although the quantity of water to be used may also be varied in accordance with the number and size of the shellfish, I preferably use the minimum quantity necessary to insure keeping the respiratory organs of the shellfish moist and to this end from 20 ml. to 600 ml. or more of salt water per pound of shellfish may be used. The preferred amount is from 200 ml. to 400 ml. per pound of lobster, and from 40 ml. to 120 ml. for claims, oysters, mussels, etc., although it is to be understood that if desired larger or smaller quantities of water may be used.

An adequate oxygen supply is, of course, provided, and accordingly the water may be saturated with oxygen or an oxygen-containing gas in any conventional manner, and the gaseous atmosphere above the water may be displaced by or saturated with oxygen so that there will be more than sufficient to supply the requirements of the shellfish during the period of confinement within the container. To this end oxygen gas may be introduced into the container in any suitable manner, but if desired a suitable oxygen-evolving material or device may be employed, provided that such is capable of maintaining an adequate oxygen supply.

Although the environment thus provided, when maintained at the proper temperature level, is usually adequate to supply the essential requirements to maintain the shellfish alive and in healthy condition, the accumulation of carbon dioxide expelled by the shellfish would soon produce fatal results. However, by introducing into the environment an alkaline earth compound of the above type, with or without a small quantity of the aforementioned soluble salts, I am able effectively to dispose of or prevent toxic accumulations of carbon dioxide and thus insure vitality for prolonged periods Typical basic compounds of the aforementioned class include the hydroxides, oxides and peroxides of calcium, barium, strontium, and magnesium, all of which are alkaline and capable of reacting with carbon dioxide, and hence capable of producing satisfactory results in preserving lobsters, crabs, clams, mussels and oysters.

The aforementioned soluble salts comprise the acetates, haloids (excepting fluorine compounds), the nitrates and nitrites of calcium, barium, strontium and magnesium, the sulphate of magnesium and solar salt, all of which are stable, non-toxic to the shellfish, and readily soluble; and of these the acetates of calcium and magnesium, the chlorides of calcium, magnesium and strontium, solar salt and magnesium sulphate are preferred.

One or more basic compounds may be introduced into the environment in one or more of several ways; for example, by adding the material in dry condition, or in a water solution or a finely divided suspension; but if desired, the material may be placed in a suitable holder, such as a porous bag or the like, and suspended so that it comes in direct contact with the moist gaseous atmosphere and/or the water in the container, or the basic compound may be prepared in the form of a coating which lines the interior of the container, in which case it may come in contact with both the gaseous atmosphere and the water within the container. In any case the amount of basic compound in the environment within the container should be sufficient to establish a pH of at least 9 or more, thereby to provide a medium which is effective to react with the carbon dioxide expelled by the shellfish to form a non-toxic carbonate which may be in part precipitated. The particular amount of basic compound to be added, depends upon the weight of shellfish and the period during which the shellfish are to be confined within the container. Practical working limits are from 5 to 10 gms. of basic compound per pound of shellfish, although greater or lesser amounts may be used, provided that a pH of at least 9 is established. Although the presence of such a compound may result in a substantial alteration of the chemical composition of the water therein, there is no appreciable deleterious effect on the vitality of the shellfish which is capable of surviving in such environment for a period of five days to two weeks or more, depending upon the type of shellfish, after which the shellfish may be removed and kept in the conventional manner for a period of several more days before being consumed.

While the specific conditions for the adaptation of the invention to actual instances of use may vary within considerable limits, and so as to accommodate different kinds of shellfish, as well as to conform to the practical exigencies of commerce and transportation, the following procedures and recommendations have produced successful results.

Preliminary preparation of the water may be desirable, before the shellfish are packed and to this end clean sea water is obtained and cooled, if necessary. The temperature may advantageously be reduced as low as expedient, but short of freezing or injury to the shellfish. For practical purposes 0–5° C. is convenient and a temperature preferably less than 10° C. is maintained throughout all periods of storage and shipment. A predetermined quantity of the sea water is run into a suitable container and one or more basic compounds may be added, either dispersed in finely divided condition, or in solution, or otherwise as above suggested. Either before or after adding the basic compound the shellfish may be packed, after which the sea water may be saturated with oxygen in any desired manner and at any desired pressure, as for example by introducing the gas immediately at the end of a reduced pressure treatment, if the latter is deemed necessary or advisable.

When the shellfish has been packed in the manner above suggested, the container may be hermetically sealed, it being understood that as far as pressure conditions are concerned the pressure in the container may be above or below atmospheric pressure, and in all cases the shellfish will survive satisfactorily and in healthy condition so long as free oxygen is available.

Figure 2:
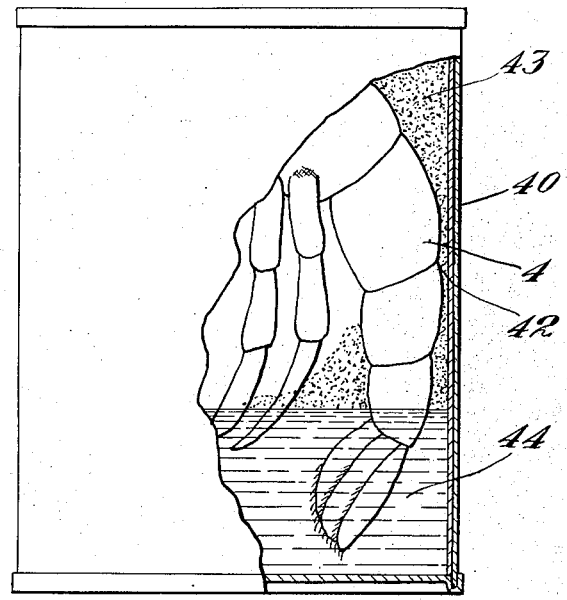

A typical form of equipment which may be used in the practice of the invention for keeping lobsters, for example, is illustrated in the accompanying drawings, wherein Fig. 1 is a schematic view of an arrangement for packing and sealing shellfish under pressure or partial vacuum; and Fig. 2 is an elevational view, with parts broken away, illustrating a modification in which the alkaline earth compound is applied to the walls of the container in the form of a lining.

Referring to Fig. 1, in accordance with what is now considered a preferred procedure, a conventional container such as a gallon can 1 having an open top, may be packed with shellfish such as lobsters, crabs, mussels, oysters or clams in appropriate amounts, e. g. one lobster or 100 clams, together with a suitable amount of sea water 3 preferably of the order of 200 to 400 ml. per pound of lobster or 100 clams. As here shown by way of illustration, the container 1 is packed with a lobster 4 in such a manner as to permit as great a freedom of movement as possible.

If the sea water 3 has already been treated with sufficient basic compound the container may be placed in a packing chamber 22, otherwise an adequate amount of the compound is preferably added before placing the container in the packing chamber, with or without a predetermined quantity of the soluble salt. In any case it is advantageous and advisable to provide a reserve supply of the basic compound and to this end a fabric or cellulose bag 20 or the like, containing in solid form, preferably pulverized, the reverse supply of compound, may also be inserted. In this manner a saturated solution of the compound is assured at all times. From five to ten grams of slaked lime per pound of lobster has been found sufficient for a period of a week or more.

With the lobster, water and basic compound packed in the container disposed within the packing chamber 22 and the cover 32 held in proper position, the chamber may then be closed by shutting the door 23, and a vacuum pump 24 connected with the chamber by means of pipe line 25 may then be started. When the pressure in the chamber has been reduced to a predetermined level, as indicated by the gauge 26, the three-way valve 27 may be operated to shut off the pump 24 and connect the line 25 with the line 28 which is connected with an oxygen tank 29. By means of valve 30 the requisite amount of oxygen may be admitted to the sealing chamber 22 and by means of a conventional sealing mechanism the container cover 32 is applied and hermetically sealed by the sealing disk 33. An escape valve 35 is then opened to the atmosphere and when atmospheric pressure conditions have been restored to the chamber 22 the packed and sealed container 1 may be withdrawn through the door 23 and is now ready for storage or shipment.

As previously indicated, approximately 400 ml. of sea water per pound of lobster is generally sufficient for a period of a week or more, and for a similar period approximately 2500 cc. of oxygen at atmospheric pressure and normal temperature, or 1500 cc. at 2° C. and a pressure of 4 to 8 pounds per square inch above that of the atmosphere have been found sufficient, although if desired a greater or lesser amount may be used.

When thus packed the lobster may utilize the oxygen-saturated water and/or atmosphere which surrounds and wets its respiratory organs and from which its system extracts the oxygen, and in the course of metabolism such oxygen is converted to carbon dioxide which is later expelled into the surrounding medium. The carbon dioxide expelled reacts with the basic compound present and is converted into a stable or relatively insoluble form of carbonate and is thus permanently fixed as an inert harmless solid which may either settle out or remain suspended in the water.

When the container is kept at a temperature of the order of 5° C. it may be stored or transported and the shellfish therein will be kept alive and in healthy condition for a period of a week or more. When the container is opened the shellfish may be removed and if desired packed on ice and kept alive for a period of several more days before being consumed.

Referring to Fig. 2, the container 40 shown therein may be substituted for the container 1 (shown in Fig. 1) in the procedure above described. The container 40 may be of conventional design and construction and one or more of its interior walls, or parts thereof, are provided with a coating or lining composed of a basic compound, such as lime, together with a suitable binder, if necessary. In this embodiment the liner 42 constitutes the source of supply of the alkaline earth compound, and, coming in direct contact with both the gaseous atmosphere 43 and the sea water 44, effectively reacts with carbon dioxide expelled by the lobster or other type of shellfish within the container.

In each of the above examples the use of calcium hydroxide has been suggested as the preferred type of basic compound, but it is to be understood that the same or equivalent amount of any of the other types of the aforementioned basic compounds may be used, and it is to be noted that the hydroxides of magnesium and strontium have given good results, notwithstanding their relatively low solubility. In cases where it is desired to use a soluble salt in conjunction with one or more basic compounds, approximately the same relative proportions may be used for satisfactory results, although the amount may be varied throughout a wide range without producing harmful effects on the shellfish.

Although the specific examples above set forth show preferred procedures for preserving lobsters, it is to be understood that crabs, clams, mussels and oysters may be treated in the same or similar manner, the following table being illustrative of the preferred conditions when packed in one gallon sanitary metal containers:

|  | Sea Water (per pound of shellfish) | Basic Compound (CaO per pound of shellfish) | Oxygen Pressure |
| --- | --- | --- | --- |
|  | Ml. | Grams | Lbs. |
| Crabs | 300–500 | 6–12 | 4 |
| Clams | 40–120 | 5–10 | 4 |
| Oysters | 40–120 | 5–10 | 4 |
| Mussels | 40–120 | 5–10 | 4 |

It is also to be understood that if desired mixtures of two or more basic compounds and/or soluble salts may be used, a particularly satisfactory treating compound comprising a mixture of calcium hydroxide and sea salt. Although satisfactory results have been obtained when using of the order of five grams of the basic compound per pound of shellfish, this proportion may be varied throughout a wide range, and in any case it is merely necessary to provide sufficient compound to react with the carbon dioxide expelled by the shellfish and prevent the pH of the water within the container from ultimately dropping substantially below 7.

The present application is a continuation-in-part of my copending application Serial No. 410,803, filed September 15, 1941, now abandoned.

I claim:

1. An article of commerce comprising a sealed container having therein live shellfish, at least 5 grams of a basic non-toxic compound of an alkaline earth metal per pound of shellfish and from 20 ml. to 600 ml. of salt water per pound of shellfish, said salt water having a pH of at least 9 and being saturated with oxygen, the gaseous atmosphere within said container having a concentration of free oxygen greater than air.

2. An article of commerce comprising a sealed container having therein live shellfish, from 5 to 12 grams of lime per pound of shellfish, and from 20 ml. to 600 ml. of salt water per pound of shellfish, said salt water having a pH of at least 9 and being saturated with oxygen, the gaseous atmosphere within said container having a concentration of free oxygen greater than air.

3. An article of commerce comprising a sealed container having therein at least one live lobster, at least 5 grams of a basic non-toxic compound of an alkaline earth metal per pound of lobster, and approximately 200 to 400 ml. of salt water per pound of lobster, said salt water having a pH of at least 9 and being saturated with oxygen, the gaseous atmosphere within said container having a concentration of free oxygen greater than air.

BERNARD E. PROCTOR.

REFERENCES CITED

The following references are of record in the file of this patent:

UNITED STATES PATENTS

| Number | Name | Date |
| --- | --- | --- |
| 1,747,804 | Travers et al. | Feb. 18, 1930 |
| 2,302,336 | Macdonald | Nov. 17, 1942 |
| 2,316,607 | Macdonald | Apr. 13, 1943 |

OTHER REFERENCES

Book entitled "Gold-Fish Varieties and Tropical Aquarium Fishes," fourteenth edition, by W. T. Innes, published in 1931, page 95.

Pamphlet entitled "The Public Aquarium" by Townsend, Bureau of Fisheries Document No. 1045, published in 1928, page 303.